C. BOSWORTH.
MEASURING ATTACHMENT FOR MICROMETER CALIPERS.
APPLICATION FILED JUNE 18, 1908.
925,280. Patented June 15, 1909.
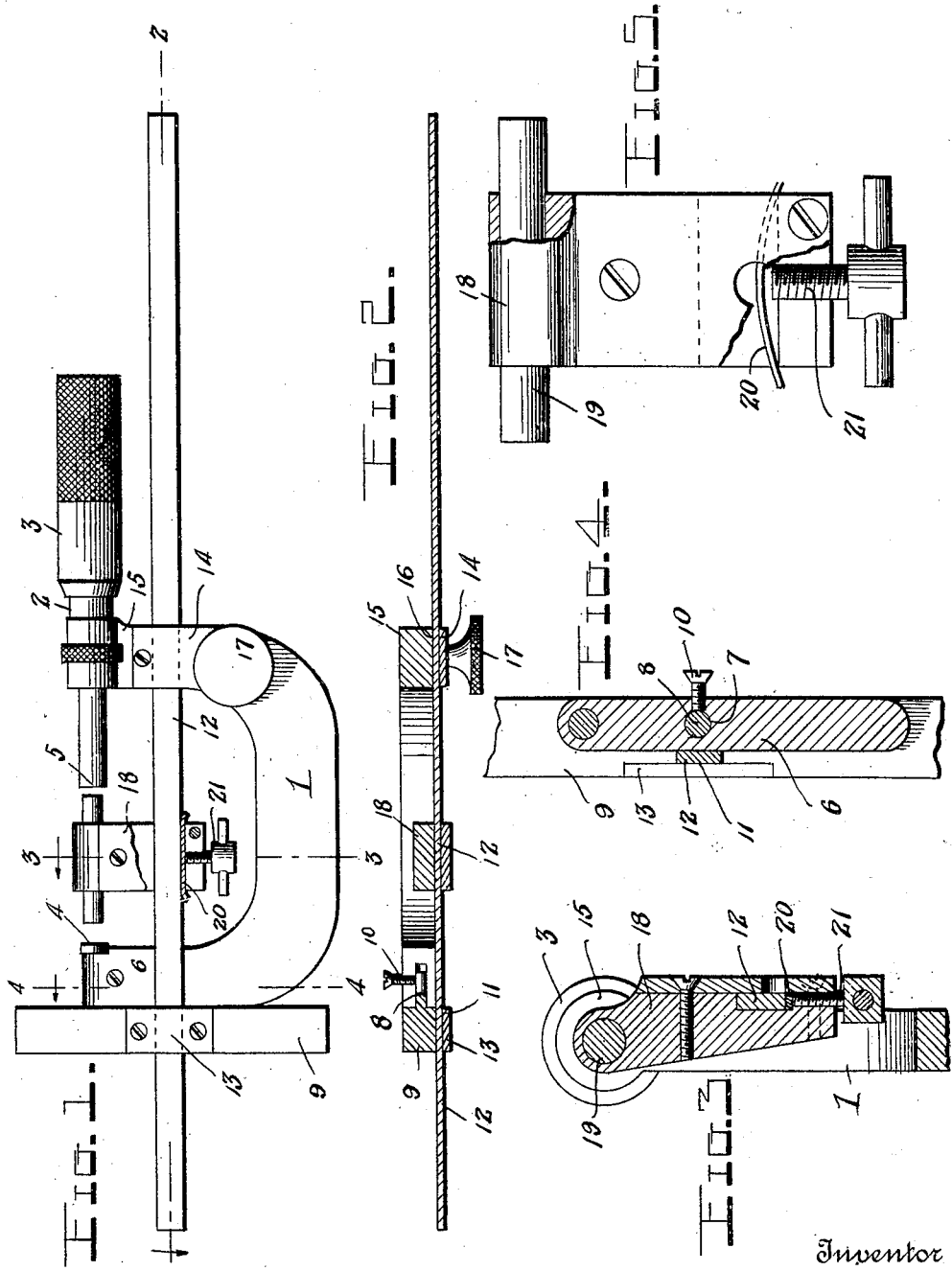
Witnesses
Chas. L. Griesbauer.
C. Clemtra
Inventor
Charles Bosworth.
By H. B. Willson & Co.
Attorneys

UNITED STATES PATENT OFFICE.

CHARLES BOSWORTH, OF PROVIDENCE, RHODE ISLAND, ASSIGNOR, BY DIRECT AND MESNE ASSIGNMENTS, OF ONE-HUNDRED-AND-FIFTEEN TWO-HUNDREDTHS TO GEORGE F. DAMON, OF PROVIDENCE, RHODE ISLAND.

MEASURING ATTACHMENT FOR MICROMETER-CALIPERS.

No. 925,280.  Specification of Letters Patent.  Patented June 15, 1909.

Application filed June 18, 1903. Serial No. 439,190.

*To all whom it may concern:*

Be it known that I, CHARLES BOSWORTH, a citizen of the United States, residing at Providence, in the county of Providence and State of Rhode Island, have invented certain new and useful Improvements in Measuring Attachments for Micrometer-Calipers; and I do declare the following to be a full, clear, and exact description of the invention, such as will enable others skilled in the art to which it appertains to make and use the same.

This invention relates to new and useful improvements in measuring instruments and attachments thereto such as micrometer calipers, etc.; and has for one of its principal objects to provide an attachment of this kind which may be applied to a micrometer or other form of caliper as well as to other like measuring instruments, whereby a combination instrument may be afforded, through the use of which measurements may be taken by a single instrument which could only otherwise be taken through the use of two or more instruments, the attachment being of simple and inexpensive construction.

In the accompanying drawings,—Figure 1 is a plan view, illustrating the application of the attachment to a micrometer caliper, with parts broken away; Fig. 2 is a longitudinal section taken on the plane indicated by the dotted line 2—2 of Fig. 1; Fig. 3 is a cross section taken on the line 3—3 of Fig. 1; Fig. 4 is a cross section taken on the line 4—4 of Fig. 1; and Fig. 5 is a detail view in side elevation of the sliding member, the same being represented on an enlarged scale with parts broken away.

Referring to the drawings, which are for illustrative purposes only, and, therefore, are not drawn to any particular scale, the numeral 1 indicates the frame of a pair of micrometer calipers of ordinary form, 2 the barrel of the calipers and 3 the thimble of the calipers.

The numerals 4 and 5 indicate the measuring points of the calipers, the measuring point 5 being provided by the inner end of the shank or body portion of the measuring screw of the calipers.

As shown, the outer arm 6 of the caliper frame is formed with a socket 7, designed to receive a laterally extending pin 8, formed on the inner side edge of a transverse base or rest 9 designed to fit against the outer surface of said arm 6, a screw 10 being arranged to screw through said arm in position to engage the pin 8 of the base or rest 9, whereby the latter may be removably secured in position. In practice, the base or rest, instead of being detachably connected with the frame of the calipers, may be formed as an integral part thereof. It is also evident that the base or rest if detachably connected with the caliper frame may be connected by other means than that illustrated and described. It is also evident that the base 9 may be so formed as to serve as a caliper jaw or wholly removed and a caliper jaw substituted in its place and that by the addition of a caliper jaw or other suitable base applied to the sliding member 12, the instrument may be converted into a caliper, height gage, or other measuring instrument of increased capacity by the use of the sliding block 18.

In carrying out the invention, the top side of the base or rest is formed with a central transverse guide recess 11, through which is adapted to slide one end of a slide bar or bar 12, designed to slide against the top face of the caliper frame, a guide plate 13 being fastened by screws or other equivalent means over the recessed portion of the base or rest, the purpose of which will be disclosed.

A clamping plate 14 is attached at its inner end to one face of the inner caliper frame arm 15 by a screw or the like, and is formed in its inner face adjacent said end with a guide recess 16, to receive and guide the inner end of the slide bar or bar 12. A binding screw 17 is arranged to screw through the outer end of said clamping plate and into the caliper frame arm 15, to clamp the plate 14 against the sliding member when it is desirous to retain the latter in fixed position.

A sliding block 18 is arranged to slide on the sliding member or bar 12 between the arms of the caliper frame the inner end of the sliding block being formed with a longitudinally disposed engaging pin 19, the ends of which are designed to engage the measuring points 4 and 5, respectively. A spring gib or clamp 20 is carried by the outer end of the sliding block in position to engage the outer side edge of the sliding bar or member 12, said gib being adapted to be forced into clamping engagement with the sliding member by a screw 21, the body of which screws into the outer end of the sliding block in position to engage the spring gib or clamp.

To use the device as a depth gage, the slide bar is adjusted to bring its outer end flush with the outer surface or face of the base or rest 9, and the binding screw 17 is then tightened to clamp the sliding member 12 in said position to prevent accidental displacement of the slide bar, the micrometer thimble 3 having been previously screwed back to read one inch, or other unit of measurement. The sliding block is then moved back on the sliding member until the inner end of the contact or engaging pin 19 thereof is in contact with the measuring point 5. The spring gib or plate 20 is then clamped against the sliding member and the binding screw 17 being released the sliding member 12 with block 18 clamped thereto is moved longitudinally until the outer end of the contact or engaging pin 19 engages the measuring point 4 of the caliper frame arm 6, which operation moves the sliding member one unit of measurement. This operation is continued until the depth of an object has been gaged, the distance traveled by the sliding member being gaged by multiplying one inch or other unit of measurement by a multiple corresponding with the number of times the sliding block has been moved in a direction toward the outer caliper frame arm 6, and any fraction of an inch being determined by moving the measuring point 5 in contact with the inner end of the engaging pin 19 of the sliding block 20 by turning the thimble 3 and reading the graduations on the barrel 2 in the usual manner.

While the invention has been described and shown as applied to a micrometer caliper and arranged as a depth gage, it is evident that it is also equally applicable to take the place of the present height gage and vernier caliper, or other measuring instrument.

By using the invention in connection with a two-inch micrometer, as shown, the latter may be readily converted into a one-inch micrometer by simply moving the outer end of the engaging pin 19 into contact with the measuring point 4, it being understood that the length of said engaging pin is one inch.

Having thus described my invention I claim:

1. In combination with a micrometer caliper, a measuring bar mounted to slide longitudinally through the arms of the caliper frame, and a sliding block adjustably mounted on the measuring bar between the arms of the caliper frame and provided with a longitudinal contact pin adapted to limit movement of the sliding block.

2. In combination with a micrometer caliper, a measuring bar arranged to slide longitudinally of the caliper frame, clamping means carried by the caliper frame for retaining the sliding bar in an adjusted position, a sliding block interposed between the ends of the caliper frame, the former being supported by and movable longitudinally of the sliding bar, and clamping means for retaining the sliding block in an adjusted position.

3. The combination with a micrometer caliper of a measuring bar guided by and movable longitudinally of the caliper frame, a sliding block interposed between the arms of the frame and adapted for longitudinal adjustment upon the sliding bar, and a longitudinally disposed contact pin carried by the sliding block in position to have its ends engage the measuring points of the calipers.

4. The combination with a micrometer caliper, of a measuring bar guided by and movable longitudinally of the caliper frame, a sliding block interposed between the arms of the frame and adapted for longitudinal adjustment upon the sliding bar, and a longitudinally disposed contact pin carried by the sliding block in position to have its ends engage the measuring points of the calipers, the length of the contact pin being equal to half the maximum distance between the measuring points of the calipers.

In testimony whereof I have hereunto set my hand in presence of two subscribing witnesses.

CHARLES BOSWORTH.

Witnesses:
HARRY D. BELLIN,
ZECHARIAH R. TUCKER.